(12) United States Patent
Allen

(10) Patent No.: US 8,116,528 B2
(45) Date of Patent: Feb. 14, 2012

(54) ILLUMINATION SOURCE FOR AN IMAGE BASED OCCUPANT CLASSIFICATION SYSTEM AND VEHICLE USING SAME

(75) Inventor: Brian T. Allen, Hilliard, OH (US)

(73) Assignee: Honda Motor Company, Ltd., Tokyo (JP)

( * ) Notice: Subject to any disclaimer, the term of this patent is extended or adjusted under 35 U.S.C. 154(b) by 763 days.

(21) Appl. No.: 12/247,343

(22) Filed: Oct. 8, 2008

(65) Prior Publication Data
US 2010/0086178 A1 Apr. 8, 2010

(51) Int. Cl.
G06K 9/00 (2006.01)
B60R 22/00 (2006.01)

(52) U.S. Cl. .................. 382/104; 382/172; 701/45

(58) Field of Classification Search .......... 382/100, 382/103, 104, 105, 106, 107, 155, 162, 168, 382/173, 181, 189–199, 209, 219, 232, 254, 382/274, 276, 287–291, 305, 312, 172; 701/45; 340/438
See application file for complete search history.

(56) References Cited

U.S. PATENT DOCUMENTS

| | | | |
|---|---|---|---|
| 4,885,566 A | 12/1989 | Aoki et al. | |
| 5,187,465 A * | 2/1993 | Stonerook et al. | 340/438 |
| 5,330,226 A | 7/1994 | Gentry et al. | |
| 5,440,913 A | 8/1995 | Crispin et al. | |
| 5,726,887 A | 3/1998 | Spies et al. | |
| 5,785,347 A | 7/1998 | Adolph et al. | |
| 5,927,752 A | 7/1999 | Brandin | |
| 6,151,540 A * | 11/2000 | Anishetty | 701/45 |
| 6,203,059 B1 | 3/2001 | Mazur et al. | |
| 6,218,739 B1 | 4/2001 | Fendt | |
| 6,598,900 B2 | 7/2003 | Stanley et al. | |
| 6,771,175 B1 | 8/2004 | Eagle et al. | |
| 6,781,676 B2 | 8/2004 | Wallace et al. | |
| 6,961,443 B2 * | 11/2005 | Mahbub | 382/100 |
| 6,985,077 B2 | 1/2006 | Nathan et al. | |
| 7,039,513 B2 | 5/2006 | Hermann et al. | |
| 7,095,002 B2 | 8/2006 | Kong et al. | |
| 7,110,571 B2 * | 9/2006 | Occhipinti | 382/104 |
| 7,983,817 B2 * | 7/2011 | Breed | 701/45 |
| 2005/0111700 A1 | 5/2005 | O'Boyle et al. | |
| 2005/0263992 A1 | 12/2005 | Matsida | |
| 2006/0049929 A1 | 3/2006 | Lawrence et al. | |
| 2006/0092401 A1 | 5/2006 | Troxell et al. | |

(Continued)

FOREIGN PATENT DOCUMENTS

JP 2004161087 A 6/2004
JP 2007055294 A 3/2007

OTHER PUBLICATIONS

U.S. Appl. No. 12/247,376, Titled: Image Based Occupant Classification Systems for Determining Occupant Classification and Seat Belt Status and Vehicles Having Same, filed Oct. 8, 2008: Inventor: Brian T. Allen, in its entirety.

(Continued)

Primary Examiner — Seyed Azarian
(74) Attorney, Agent, or Firm — Ulmer & Berne LLP

(57) ABSTRACT

An image based occupant classification system includes a supplemental restraint system, an image sensor, and an illumination source. The image sensor is in communication with the supplemental restraint system and is configured to monitor vehicular conditions. The illumination source is in communication with the supplemental restraint system and is configured to selectively actuate in response to the collision indicator. Vehicles are also provided.

19 Claims, 6 Drawing Sheets

U.S. PATENT DOCUMENTS

| | | | |
|---|---|---|---|
| 2007/0055428 | A1 | 3/2007 | Kong et al. |
| 2007/0085669 | A1 | 4/2007 | Becker et al. |
| 2007/0194900 | A1 | 8/2007 | Hawkins et al. |
| 2007/0195990 | A1 | 8/2007 | Levy |
| 2007/0206836 | A1 | 9/2007 | Yoon et al. |
| 2007/0222572 | A1 | 9/2007 | Downey et al. |
| 2008/0094195 | A1 | 4/2008 | Odate et al. |
| 2008/0164682 | A1 | 7/2008 | Matsuda |
| 2009/0034794 | A1 | 2/2009 | Ishikawa |

OTHER PUBLICATIONS

U.S. Appl. No. 12/247,540, Titled: Methods for Testing an Image Based Occupant Classification System, filed Oct. 8, 2008: Inventor: Brian T. Allen, in its entirety.

Ruth Ilan, Non-Final Office Action, Notification Date of Apr. 5, 2011, U.S. Appl. No. 12/247,376, Titled: Image Based Occupant Classification Systems for Determining Occupant Classification and Seat Belt Status and Vehicles Having Same, filed Oct. 8, 2008, Inventor: Brian T. Allen, 7 pages.

Ilan, Ruth, Notice of Allowance and Fee(s) Due; Notification Date of Jul. 28, 2011; U.S. Appl. No. 12/247,376; Titled: Methods for Testing an Image Based Occupant Classification System; filed Oct. 8, 2008; 5 pages; Inventor: Brian T. Allen.

Azarian, Seyed H., Non-Final Office Action; Notification Date of Sep. 9, 2011; U.S. Appl. No. 12/247,343; Titled: Illumination Source for an Image Based Occupant Classification System and Vehicle Using Same; filed Oct. 8, 2008; 23 pages; Inventor: Brian T. Allen.

\* cited by examiner

ILLUMINATION SOURCE FOR AN IMAGE BASED OCCUPANT CLASSIFICATION SYSTEM AND VEHICLE USING SAME

TECHNICAL FIELD

A supplemental restraint system can actuate safety devices when a vehicle is involved in a collision. An image based occupant classification system can monitor vehicular characteristics to control the safety devices.

BACKGROUND

Image based occupant classification systems ("IBOCS") can control safety devices on a vehicle according to monitored vehicular conditions. In particular, an IBOCS can monitor an occupant of a vehicle. During normal operation of the vehicle, actuation of airbags can be suppressed according to certain characteristics of the occupant (e.g., size, shape, position). However, when a vehicle is involved in a collision, deployment of an airbag can be regulated according to the movement of the occupant. Determining the movement of the occupant can often be hindered by poor image quality. Conventional measures undertaken to improve image quality can be slow, processor intense, and costly.

SUMMARY

According to one embodiment, an image based occupant classification system can comprise a supplemental restraint system, an image sensor, and an illumination source. The supplemental restraint system is configured to monitor collision conditions for a vehicle. The supplemental restraint system is also configured to provide a collision indicator based upon the collision conditions. The image sensor is in communication with the supplemental restraint system and is configured to monitor vehicular conditions. The illumination source is in communication with the supplemental restraint system. The illumination source is configured to selectively illuminate an area adjacent to the image sensor in response to the collision indicator.

In another embodiment, an image based occupant classification system can comprise a supplemental restraint system, an image sensor, and an illumination source. The image sensor is disposed within a passenger compartment of a vehicle and is configured to monitor vehicular conditions. The image sensor is in communication with the supplemental restraint system to facilitate transmission of the monitored vehicular conditions to the supplemental restraint system. The illumination source is disposed within a passenger compartment of a vehicle. The illumination source is in communication with the supplemental restraint system and is selectively actuated in response to a collision indicator provided from the supplemental restraint system.

A vehicle is also provided. The vehicle can comprise a supplemental restraint system, an image sensor, and an illumination source. The image sensor is disposed within a passenger compartment of a vehicle and is configured to monitor vehicular conditions. The image sensor is in communication with the supplemental restraint system to facilitate transmission of the monitored vehicular conditions to the supplemental restraint system. The illumination source is disposed within the passenger compartment. The illumination source is in communication with the supplemental restraint system and is selectively actuated in response to a collision indicator provided from the supplemental restraint system.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
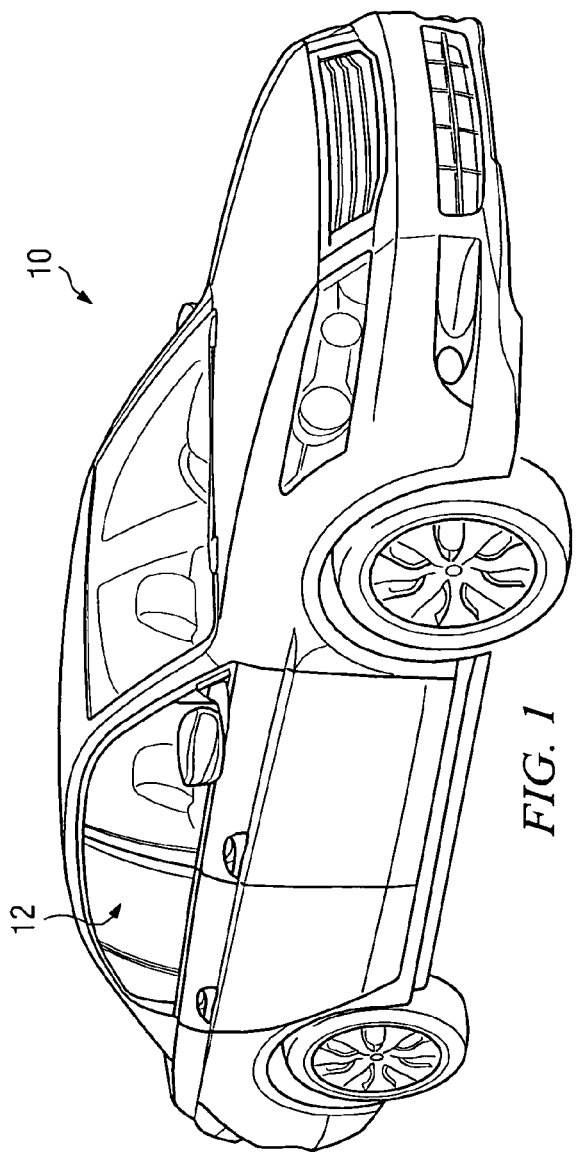
FIG. 1 is a perspective view depicting a vehicle in accordance with one embodiment.

The present invention and its operation are hereinafter described in detail in connection with the views and examples of FIGS. 1-8, wherein like numbers indicate the same or corresponding elements throughout the views. An IBOCS in accordance with one embodiment can be provided on a vehicle 10 which is shown in FIG. 1 to comprise an automobile. However, an IBOCS can alternatively be provided upon any of a variety of alternative vehicle, such as, for example, a truck, a van, a recreational vehicle, a utility vehicle, an aircraft, agricultural equipment, or construction equipment. Though the vehicle 10 is shown to be of a type which includes a passenger compartment 12 which is accessible through four respective passenger doors, it will be appreciated that vehicles in accordance with other embodiments can include any of a variety of other suitable passenger compartments (e.g., provided within a two-door sedan, pickup truck, or convertible).

Figure 2:
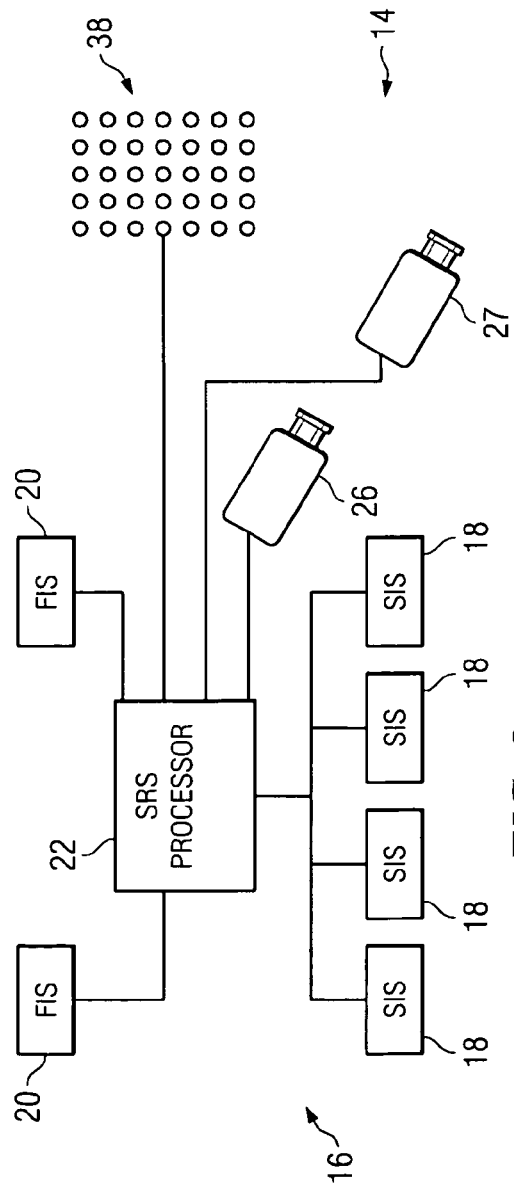
FIG. 2 is a schematic view depicting an IBOCS of the vehicle of FIG. 1.

As illustrated in FIG. 2, an IBOCS 14 can include a supplemental restraint system ("SRS") 16. The SRS 16 can include various safety devices (e.g., seat belt retractors, airbags, crash avoidance systems) that can be actuated during a collision. The SRS 16 can be configured to monitor vehicular collision conditions. The SRS 16 is shown in FIG. 2 to include side impact sensors 18 and front impact sensors 20. In one embodiment, the side impact sensors 18 and front impact sensors 20 can include accelerometers. In such an embodiment, the accelerometers can be disposed along the vehicle to monitor the acceleration encountered during a collision. For example, the side impact sensors 18 can be disposed along a side of the vehicle 10 (e.g., within one or more side pillars) such that a collision along a side of the vehicle 10 can be monitored. Additionally, the front impact sensors 20 can be disposed along a front of the vehicle 10 (e.g., within a front bumper) such that a collision along a front of the vehicle 10 can be monitored. In other embodiments, impact sensors can include an image sensor, a radar unit, or a LIDAR unit. It will be appreciated that an SRS can include any of a variety of additional or alternative arrangements for monitoring vehicular collision conditions. For example, the SRS 16 can include $G_x$ and $G_y$ sensors to monitor vehicular acceleration. It will also be appreciated that, in addition or alternative to monitoring collision conditions that are native to the vehicle, the SRS 16 can monitor any of a variety of collision conditions external to the vehicle 10. For example, the SRS 16 can include an external sensor, such as a radar headway sensor, to monitor approaching objects, such as vehicles or pedestrians.

The SRS 16 can analyze the collision conditions to determine whether the vehicle 10 is experiencing a collision. If the SRS 16 determines that a collision is occurring, the safety devices (e.g., seat belt retractors, air bags, crash avoidance systems) within or associated with the SRS 16 can be actuated. In one embodiment, as illustrated in FIG. 2, an SRS processor 22 can determine whether the vehicle 10 is experiencing a collision and can, in response to the determination of a collision, facilitate actuation of one or more airbags within the vehicle (e.g., 17 in FIGS. 4 and 6 and 117 in FIG. 5). For example, the side and front impact sensors 18, 20 can be in communication with the SRS processor 22 such that the collision conditions can be transmitted to the SRS processor 22. In one embodiment, the side and front impact sensors 18, 20 can transmit collision conditions to the SRS processor 22 via communication cable (e.g., wire or fiber optic in a drive-by-wire configuration). In another embodiment, the side and front impact sensors 18, 20 can transmit collision conditions to the SRS processor 22 wirelessly. The SRS processor 22 can analyze the transmitted collision conditions to determine whether a collision is occurring and can actuate an airbag accordingly (see FIG. 7). It will be appreciated that the SRS processor 22 can include any of a variety of suitable SRS controllers and/or processors to facilitate receipt and analysis of the collision conditions. It will also be appreciated, however, that the SRS processor 22 can provide additional or alternative functionality to the SRS 16. For example, in lieu of, or in addition to, side and/or front impact sensors 18, 20 mounted along the vehicle, as described above, the SRS processor 22 can include side impact sensors (e.g., $G_x$ sensors), a front impact sensor (e.g., a $G_y$ sensors), and/or any of a variety of other collision sensors.

Figure 3:
FIG. 3 is a plot depicting a collision indicator produced by the IBOCS of FIG. 2.

In one embodiment, in response to the monitored collision conditions, the SRS 16 can generate a collision indicator 24 to facilitate actuation of the safety devices. As illustrated in FIG. 3, the collision indicator 24 can be a velocity-dependent indicator having a magnitude that increases as the likelihood of a collision increases. It will be appreciated, however, that a collision indicator can be provided according to any of a variety of alternative suitable parameters. For example, an acceleration-dependent collision indicator can be provided. In another example, a collision indicator can indicate merely whether or not a collision is occurring (e.g., a step function). It will also be appreciated that any of a variety of algorithms and/or monitored conditions can be used to generate a collision indicator.

Actuation of the safety devices can be controlled by the IBOCS 14 to ensure proper deployment when the vehicle 10 is involved in a collision. In one embodiment, actuation of the safety devices can be suppressed to ensure that the safety devices do not actuate during a collision. For example, deployment of an airbag can be suppressed when a child or child seat occupies a passenger seat. In another example, deployment of an airbag can be suppressed when a passenger seat is unoccupied. In another embodiment, when the safety devices are actuated (e.g., during a collision), the manner in which the safety devices are actuated can be regulated to ensure that proper protection is provided for a passenger. For example, deployment of an airbag can be slowed if a passenger is positioned too close to a dashboard. In another example, a left portion of an airbag can be more fully deployed for an occupant that is moving increasingly leftward during a collision.

In one embodiment, the safety devices can be selectively suppressed during startup of the vehicle 10. For example, when the vehicle 10 is started, an occupant can be identified as an adult, child, or child seat. Based upon that identification, deployment of airbags can be placed in a suppressed state (e.g., for a child or child seat) or permissive state (e.g., for an adult). The state of the airbags can be maintained with a different occupant is identified. In another embodiment, the safety devices can be selectively suppressed during a collision of the vehicle 10. For example, when the vehicle 10 initially enters into a collision, an occupant can be identified as an adult, child, or child seat. Based upon that identification, an airbag can be suppressed (e.g., for a child or child seat) or permitted to deploy (e.g., for an adult). In yet another embodiment, operation of the safety devices can be regulated during a collision, such as described above. For example, when the vehicle 10 initially enters into a collision, the movement of an occupant during the collision can be monitored and deployment of an airbag can be tailored to best cushion the occupant's movement.

To facilitate control of the various safety devices, the IBOCS 14 can monitor vehicular conditions. In one embodiment, the IBOCS 14 can monitor characteristics of an occupant disposed within the passenger compartment 12. For example, the IBOCS 14 can monitor the size, height and shape of an occupant to determine whether the occupant is an adult, a child, or a child seat (e.g., the occupant's classification). In another example, the IBOCS 14 can monitor an occupant's movement to determine the position of the occupant. However, it will be appreciated that any of a variety of other vehicular conditions can be monitored by the IBOCS 14 to facilitate control by the IBOCS 14 of the various safety devices. For example, the IBOCS 14 can monitor a passenger seat to determine whether the seat is occupied by a passenger or other object. In another example, the IBOCS 14 can monitor the presence or absence of an occupant within the passenger compartment 12. In another example, the IBOCS 14 can monitor an airbag to ensure it has deployed properly (e.g., to assess whether a backup airbag should be deployed). In yet another example, the IBOCS 14 can monitor interior components of the vehicle 10 to assess whether structural deformation has occurred, and/or whether a seat belt should be retracted. Although the vehicular conditions have been described with respect to conditions occurring within the vehicular compartment 12 (i.e., in-cabin conditions), it will be appreciated that vehicular conditions can also include conditions that occur external to the passenger compartment.

Figure 4:
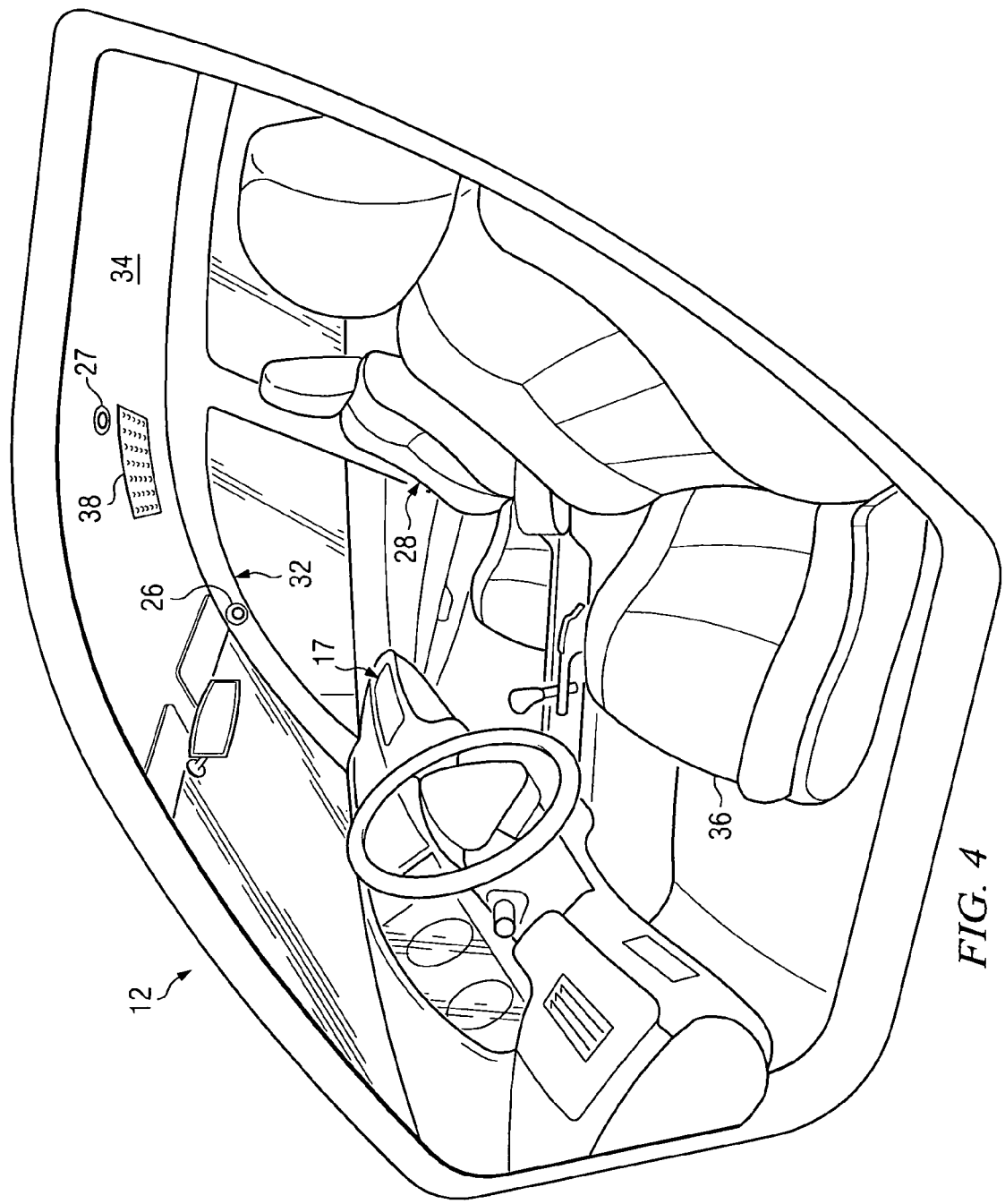
FIG. 4 is an enlarged perspective view depicting a portion of a passenger compartment of the vehicle of FIG. 1, wherein an image sensor and an illumination source in accordance with one embodiment are provided.

In one embodiment, in order to facilitate the foregoing features, the IBOCS 1.4 can include an image sensor 26 that is configured to monitor vehicular conditions. The image sensor 26 can he disposed within the passenger compartment 12 to monitor an occupant and/or a passenger seat. In one embodiment, as illustrated in FIG. 4, the image sensor 26 can be disposed adjacent to a passenger seat 28 to monitor a passenger (e.g., 30 in FIGS. 6 and 7) seated within the passenger compartment 12. Although the image sensor 26 is shown in FIG. 4 to be attached to a pillar 32 of the vehicle 10 adjacent to a passenger seat 28, it will be appreciated that an image sensor can be located in any of a variety of other suitable locations and/or arrangements within or adjacent to the passenger compartment 12 of the vehicle 10. As illustrated in the example of FIG. 4, an additional image sensor 27 can be located along the center of the passenger compartment 12 and integrated into a ceiling 34 of a vehicle. In such an embodiment, the image sensors 26, 27 can be separated by a known distance such that a 3-dimensional image can be produced. In yet another example, an image sensor can be provided adjacent to a driver's seat (e.g., 36 shown in FIG. 4) to monitor a position of a driver and can, for example, be attached to a dashboard, center console, door panel, or any of a variety of other suitable features within the passenger compartment of a vehicle. In yet another example, an image sensor can be provided adjacent to rear seats of a vehicle to monitor a position of rear-seated passengers. It will be appreciated that a vehicle can include image sensors provided in any or all of these locations. The image sensor 26 can be configured for capturing images and can, for example, comprise an infrared charge-coupled-device (CCD), a CMOS sensor, or a thermograph camera.

The image sensor 26 can be selectively actuated to capture images of the vehicular conditions. The frequency of the actuation (e.g., capture rate) can be varied according to the particular vehicular condition being captured. When a vehicular condition is not subject to frequent change, the capture rate of the image sensor 26 may be less frequent (e.g., one actuation every three seconds). However, when a vehicular condition is subject to frequent change, the capture rate of the image sensor 26 may increase. For example when defining an occupant's identification, since it is unlikely that an occupant's identification will change frequently, the capture rate of the image sensor 26 can be less frequent. However when defining an occupant's movement, since the movement of the occupant can change frequently, the capture rate of the image sensor 26 can be more frequent (e.g., every 50 milliseconds) to properly capture the movement. In one embodiment as described above, movement of an occupant can be monitored during a collision. Therefore, it will be appreciated that the capture rate of the image sensor 26 can be configured to selectively increase in response to the collision indicator.

The image sensor 26 is shown in FIG. 2 to be in direct communication with the SRS processor 22. In one embodiment, the image sensor 26 can be in communication with the SRS processor 22 via a communication cable (e.g., wire or fiber optic in a drive-by-wire configuration). In another embodiment, the image sensor 26 can be in wireless communication with the SRS processor 22. It will be appreciated that in an alternative embodiment, an image sensor and an SRS processor can communicate indirectly such as by way of one or more other components.

In one embodiment, the SRS processor 22 and the image sensor 26 can communicate with each other (e.g., bidirectional communication) to facilitate vehicular condition monitoring. In particular, the SRS processor 22 can control the actuation and/or capture rate of the image sensor 26 to monitor certain vehicular conditions. The captured vehicular conditions can be transmitted from the image sensor 26 to the SRS processor 22. The SRS processor 22 can then analyze the images to determine an occupant's classification, movement, and/or other characteristic. In another embodiment, the image sensor 26 can communicate with the SRS processor 22 (e.g., unidirectional communication) to facilitate vehicular condition monitoring. In particular, the image sensor 26 can control its own actuation and/or capture rate to monitor certain vehicular conditions. The captured vehicular conditions can be transmitted from the image sensor 26 to the SRS processor 22. The SRS processor 22 can then analyze the images to determine an occupant's classification, movement, and/or other characteristic.

Figure 5:
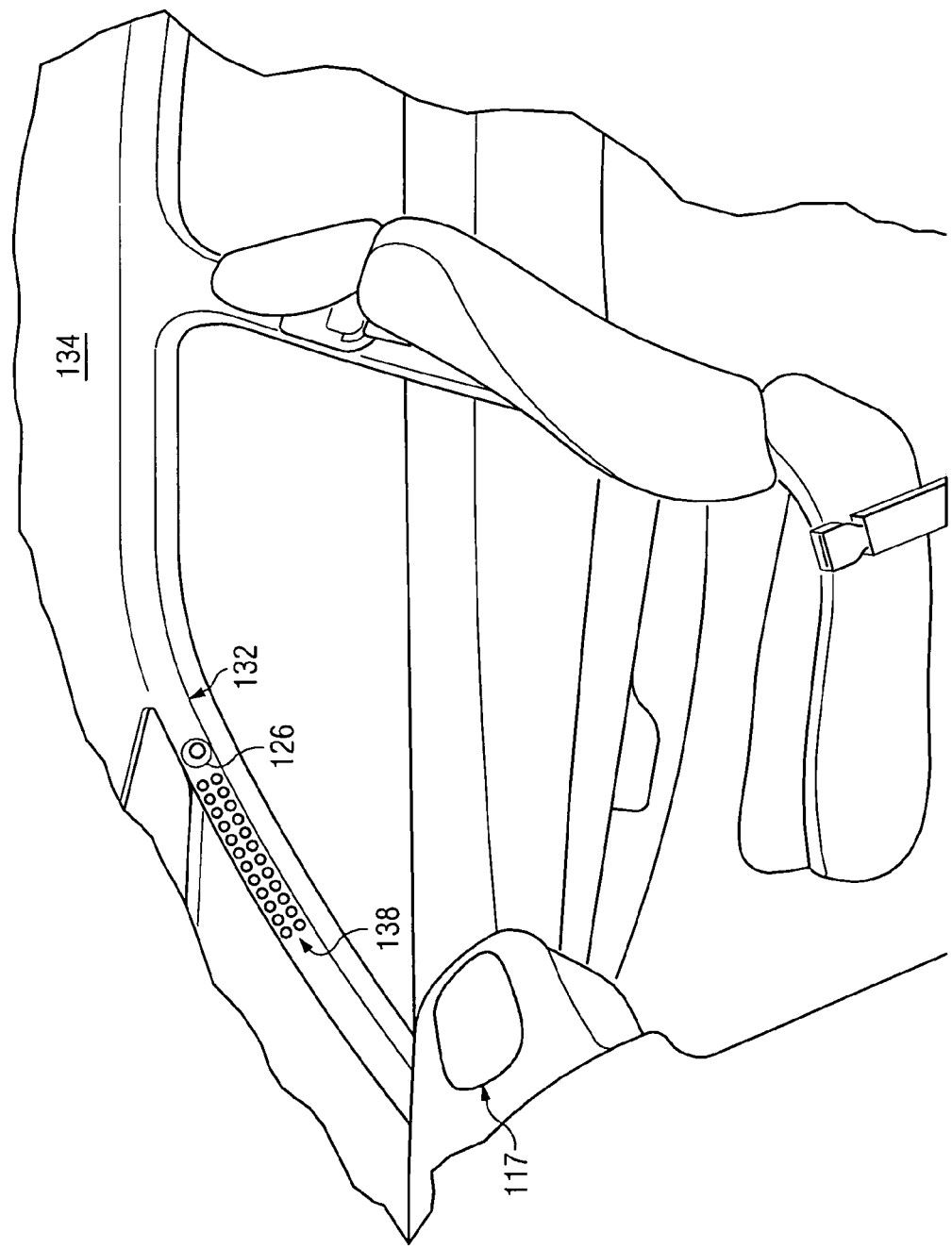
FIG. 5 is an enlarged perspective view depicting a portion of a passenger compartment of a vehicle having an image sensor and an illumination source in accordance with another embodiment.

The IBOCS 14 can include an illumination source 38 configured to illuminate an area adjacent to the image sensor 26. For example, the illumination source 38 can be disposed within or adjacent to the passenger compartment 12 to illuminate an occupant and/or a passenger seat. In one embodiment, as illustrated in FIG. 4, the illumination source 38 can be disposed adjacent to (e.g., above) a passenger seat 28. Although the illumination source 38 is shown in FIG. 4 to be attached to a ceiling 38 above the passenger seat 28, it will be appreciated that an illumination source can be located in/or adjacent to the passenger compartment 12 in any of a variety of other suitable arrangements. For example, as illustrated in the example of FIG. 5, the illumination source 138 can be attached to a pillar 132 and adjacent an image sensor 126 that is also attached to pillar 132. In another example, an illumination source can be provided adjacent to the driver's seat (e.g., 36 shown in FIG. 4). In yet another example, an illumination source can be provided adjacent to rear seats of a vehicle. It will be appreciated that a vehicle can include one or more illumination sources provided in any or all of these or other locations. The illumination source 38 can comprise, for example, an LED array, a radar source, a laser, or an incandescent bulb. In one embodiment, when the illumination source comprises an LED array, the LED array can comprise a near-infrared LED array which is configured to produce light having a near-infrared wavelength. It will be appreciated that the illumination source 38 and the SRS processor can communicate directly, as illustrated in FIG. 2, or alternatively can communicate indirectly such as through one or more other components (e.g., the image sensor 26).

The illumination source 38 can be selectively actuated to provide additional light in the passenger compartment 12. It will be appreciated that this additional light can allow the image sensor 26 to better capture movement. For example, similar to a flash bulb on a conventional camera, when additional light is provided in the passenger compartment 12 by the illumination source 38, an occupant's movement can be more easily monitored by the image sensor 26. However, when movement is not being monitored, such as when the vehicle is not moving and/or when IBOCS 14 is monitoring the size, height, and shape of an occupant to determine the classification of an occupant, additional light might not be needed or beneficial, and the illumination source may accordingly remain unactuated. Therefore, the illumination source 38 can be selectively actuated. Such selective actuation of the illumination source 38 can reduce energy consumption, increase the overall life of the illumination source 38, and prevent disturbance to the occupant that might otherwise result from additional light being introduced into the passenger compartment 12 during normal use of the vehicle.

Figure 6:
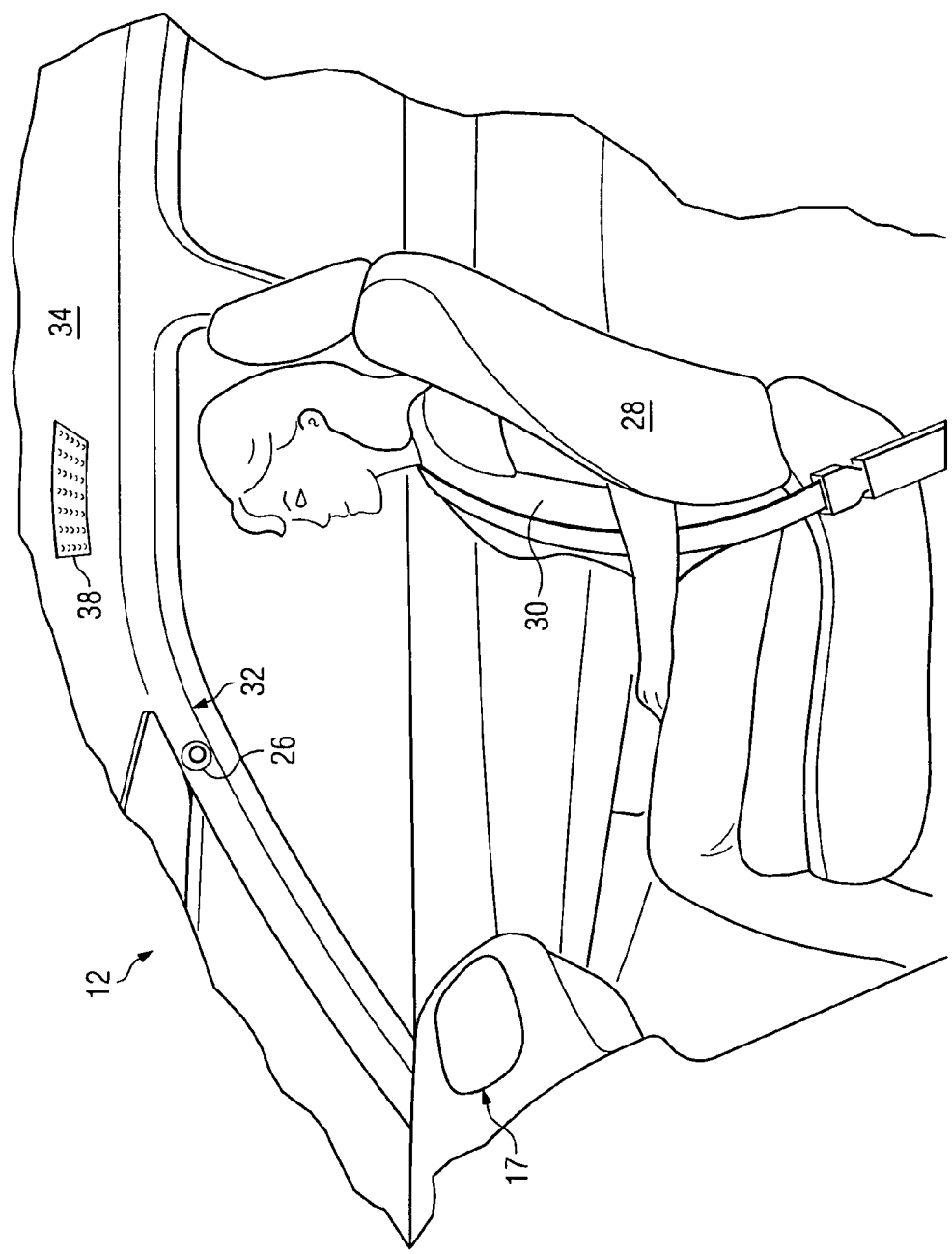
FIG. 6 is an enlarged perspective view depicting a passenger seated within the passenger compartment of FIG. 4 prior to a collision.
Figure 7:
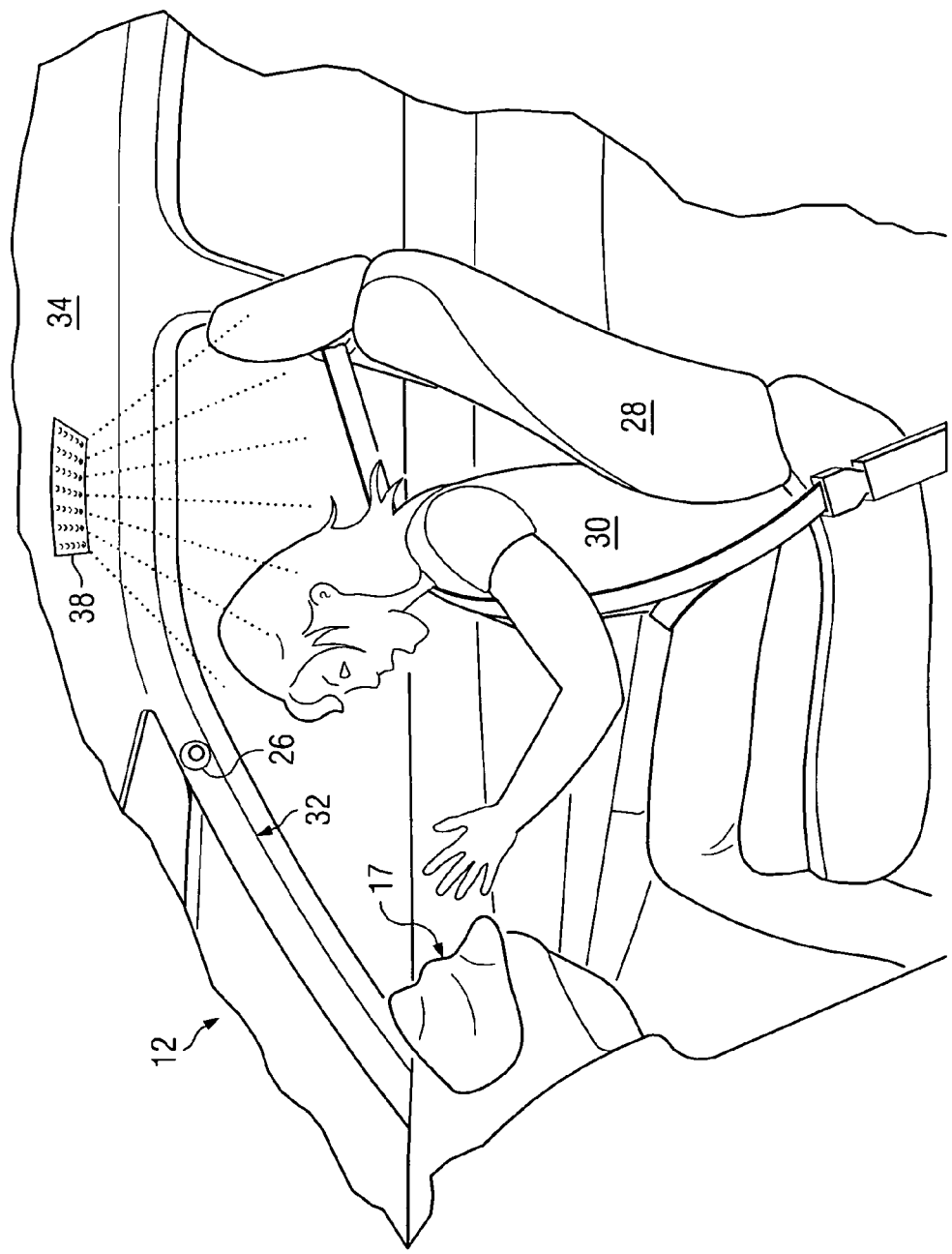
FIG. 7 is an enlarged perspective view depicting the passenger and passenger compartment of FIG. 6, during a collision, wherein the illumination source is actuated and wherein an airbag is shown to be partially inflated.

In one embodiment, the illumination source 38 can be actuated during a collision. During normal, non-collision operation of the vehicle 10, the IBOCS 14 can determine the classification of an occupant by monitoring the size, height, and shape of the passenger 30. Since these characteristics change less frequently, the illumination source 38 can remain deactivated, as illustrated in FIG. 6. However, when the vehicle 10 is involved in a collision, the IBOCS 14 can monitor the movement of the passenger 30 to regulate airbags. Since it is likely that the movement of the passenger 30 is constantly changing, the illumination source 38 can be actuated to allow the image sensor 26 to better capture the movement of the passenger 30. In one embodiment, as illustrated in FIGS. 6 and 7, during a collision, the illumination source 38 can be actuated from a fully deactivated state. However, it will be appreciated that the illumination source 38 can be actuated from a partially activated state (e.g., reduced light intensity).

It will be appreciated that the illumination source 38 can be actuated in any of a variety of arrangements. For example, the illumination source 38 can be actuated synchronously with the actuation of the image sensor 26. In another example, the illumination source 38 can remain illuminated when actuated. The illumination source 38, once actuated, can gradually increase light intensity during actuation or can alternatively maintain a consistent intensity throughout actuation.

Figure 8:
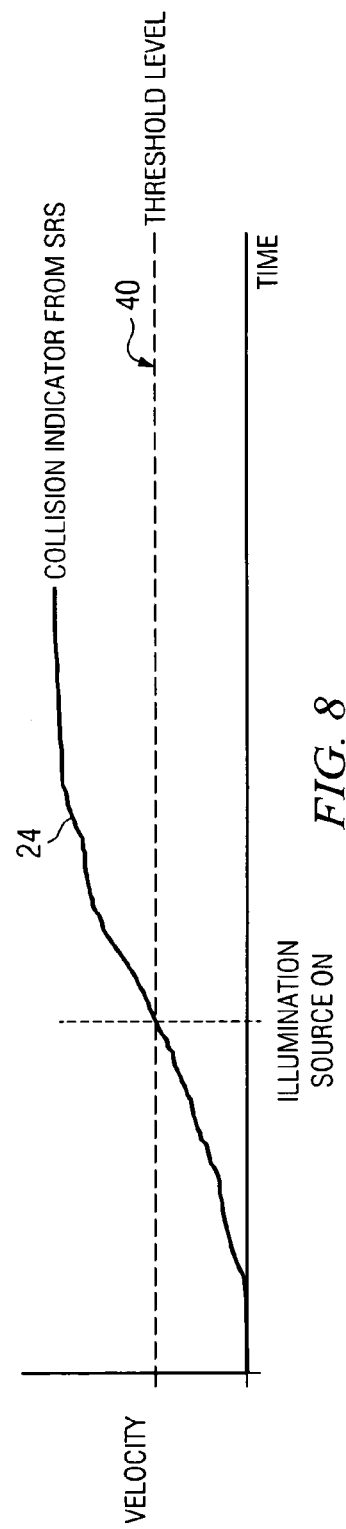
FIG. 8 is a plot depicting a threshold level associated with the collision indicator of FIG. 3 according to one embodiment.

In one embodiment, the illumination source 38 can be selectively actuated in response to the collision indicator 24. As illustrated in FIG. 8, a threshold level 40 can be set with respect to the collision indicator 24. When the collision indicator 24 achieves the threshold level 40, the illumination source 38 can be actuated. In one embodiment, the threshold level 40 is set to a predetermined value (e.g., 50%). When the collision indicator 24 indicates a probability (that the vehicle 10 will be involved in a collision) of 50% or greater, the illumination source 38 is actuated. It will be appreciated that the threshold level 40 can be associated with any of a variety of collision indicator variables (e.g., acceleration, velocity, proximity) and can be set at any of a variety of suitable values. It will also be appreciated that while the threshold level 40 is shown in FIG. 8 to be a predetermined constant, a threshold level can be established in any of a variety of manners (e.g., dynamically calculated, varying with time).

It will be appreciated that selectively actuating the illumination source 38 during a collision can improve the robustness, responsiveness, and/or accuracy of the IBOCS 14. For example, by providing supplemental light during a collision, details about an occupant may be more readily available to the IBOCS 14, thereby reducing analysis errors. Additionally, less processing power can be expended when monitoring an occupant's movement, accordingly reducing waste heat energy and thereby prolonging the life of the IBOCS 14. It will also be appreciated that using a collision indicator to actuate an image sensor and/or illumination source can improve the modularity of the IBOCS 14. For example, if a vehicle's existing SRS can generate a collision indicator, the image sensor 26 and/or the illumination source 38 can be associated with the SRS without requiring replacement of the entire SRS 16. Additionally, using only one signal (e.g., the collision signal) to control the safety devices as well as the image sensor and/or illumination source can reduce the number of IBOCS components, thereby reducing the cost of construction, waste heat and the overall physical size of the IBOCS 14.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. An image based occupant classification system comprising:
a supplemental restraint system configured to monitor collision conditions for a vehicle and provide a collision indicator based upon the collision conditions;
an image sensor in communication with the supplemental restraint system, the image sensor being configured to monitor vehicular conditions; and
an illumination source in communication with the supplemental restraint system, the illumination source being configured to selectively illuminate an area adjacent to the image sensor in response to the collision indicator;
wherein the illumination source is selectively actuated when the collision indicator achieves a threshold level.

2. The image based occupant classification system of claim 1 wherein the illumination source is actuated from a fully deactivated state in response to the collision indicator.

3. The image based occupant classification system of claim 1 wherein the image sensor is configured to capture a characteristic of an occupant.

4. The image based occupant classification system of claim 1 wherein the illumination source comprises a near-infrared LED array.

5. The image based occupant classification system of claim 1 wherein a capture rate of the image sensor is configured to selectively increase in response to the collision indicator.

6. An image based occupant classification system comprising:
a supplemental restraint system;
an image sensor disposed within a passenger compartment of a vehicle, the image sensor being configured to monitor vehicular conditions and being in communication with the supplemental restraint system to facilitate transmission of the monitored vehicular conditions to the supplemental restraint system; and
an illumination source disposed within a passenger compartment of a vehicle, the illumination source being in communication with the supplemental restraint system and being selectively actuated in response to a collision indicator provided by the supplemental restraint system;
wherein the illumination source is selectively actuated when the collision indicator achieves a threshold level.

7. The image based occupant classification system of claim 6 wherein the illumination source comprises a near-infrared LED array.

8. The image based occupant classification system of claim 6 wherein the supplemental restraint system comprises an accelerometer.

9. The image based occupant classification system of claim 6 wherein the illumination source is actuated from a fully deactivated state in response to the collision indicator.

10. The image based occupant classification system of claim 6 wherein a capture rate of the image sensor is configured to selectively increase in response to the collision indicator.

11. A vehicle comprising:
a supplemental restraint system;
an image sensor disposed within a passenger compartment of a vehicle, the image sensor being configured to monitor vehicular conditions and being in communication with the supplemental restraint system to facilitate transmission of the monitored vehicular conditions to the supplemental restraint system; and
an illumination source disposed within the passenger compartment, the illumination source being in communication with the supplemental restraint system and being selectively actuated in response to a collision indicator provided from the supplemental restraint system;

wherein the illumination source is selectively actuated when the collision indicator achieves a threshold level.

12. The vehicle of claim 11 wherein the image sensor is configured to capture a characteristic of an occupant disposed within the passenger compartment.

13. The vehicle of claim 12 wherein the illumination source comprises a near-infrared LED array.

14. The vehicle of claim 13 wherein the illumination source is actuated from a fully deactivated state in response to the collision indicator.

15. The vehicle of claim 11 wherein the image sensor is attached to at least one of a vehicular pillar and a vehicular ceiling.

16. The vehicle of claim 11 wherein the illumination source is attached to at least one of a vehicular pillar and a vehicular ceiling.

17. The vehicle of claim 11 wherein the supplemental restraint system comprises an accelerometer.

18. The vehicle of claim 17 wherein the accelerometer is disposed along a side of the vehicle to detect a side-impact vehicular collision.

19. The vehicle of claim 17 wherein the accelerometer is disposed along a front of the vehicle to detect a front-impact vehicular collision.

* * * * *

UNITED STATES PATENT AND TRADEMARK OFFICE
CERTIFICATE OF CORRECTION

PATENT NO. : 8,116,528 B2  
APPLICATION NO. : 12/247343  
DATED : February 14, 2012  
INVENTOR(S) : Brian T. Allen Page 1 of 1

It is certified that error appears in the above-identified patent and that said Letters Patent is hereby corrected as shown below:

Column 2, line 42, change "vehicle" to -- vehicles --;
Column 4, line 16, change "with" to -- until --;
Column 4, line 58, change "1.4" to -- 14 --;
Column 4, line 60, change "he" to -- be --; and
Column 5, line 21, change "thermograph" to -- thermographic --.

Signed and Sealed this
Tenth Day of April, 2012

David J. Kappos
*Director of the United States Patent and Trademark Office*